US011317757B2

(12) United States Patent
Lee et al.

(10) Patent No.: US 11,317,757 B2
(45) Date of Patent: May 3, 2022

(54) BEVERAGE DISPENSER WITH REDUCED DRIP AND SPLATTER DIFFUSER TIP

(71) Applicant: RIEKE CORPORATION, Auburn, IN (US)

(72) Inventors: Yen Kean Lee, Rohnert Park, CA (US); Fidel Aragon, Windsor, CA (US)

(73) Assignee: RIEKE CORPORATION, Auburn, IN (US)

( * ) Notice: Subject to any disclaimer, the term of this patent is extended or adjusted under 35 U.S.C. 154(b) by 473 days.

(21) Appl. No.: 16/255,207

(22) Filed: Jan. 23, 2019

(65) Prior Publication Data
US 2019/0223655 A1    Jul. 25, 2019

Related U.S. Application Data

(60) Provisional application No. 62/620,708, filed on Jan. 23, 2018.

(51) Int. Cl.
| | |
|---|---|
| *B05B 1/28* | (2006.01) |
| *B05B 11/00* | (2006.01) |
| *B05B 1/02* | (2006.01) |
| *B05B 1/14* | (2006.01) |
| *A47J 31/46* | (2006.01) |
| *B67D 1/12* | (2006.01) |
| *A47J 31/44* | (2006.01) |
| *E03C 1/08* | (2006.01) |

(52) U.S. Cl.
CPC ........... *A47J 31/46* (2013.01); *A47J 31/4403* (2013.01); *B05B 1/02* (2013.01); *B05B 1/14* (2013.01); *B05B 1/28* (2013.01); *B05B 11/0089* (2013.01); *B67D 1/1256* (2013.01); *E03C 1/08* (2013.01)

(58) Field of Classification Search
CPC ... B05B 11/0089; B05B 11/0091; B05B 1/02; B05B 1/14; B05B 1/22; B05B 1/28; B05B 1/3402; E03C 1/08; E03C 1/084; E03C 1/086
See application file for complete search history.

(56) References Cited

U.S. PATENT DOCUMENTS

| | | | | | |
|---|---|---|---|---|---|
| 3,105,641 | A | * | 10/1963 | Curcio | E03C 1/086 239/552 |
| 3,130,917 | A | * | 4/1964 | Aghnides | E03C 1/084 239/428.5 |
| 3,321,140 | A | * | 5/1967 | Parkison | E03C 1/086 239/428.5 |
| 3,322,352 | A | * | 5/1967 | Araluce | B05B 1/18 239/428.5 |
| 5,887,789 | A | * | 3/1999 | Szabo | B67C 3/281 239/1 |

(Continued)

*Primary Examiner* — John J Norton
(74) *Attorney, Agent, or Firm* — McDonald Hopkins LLC

(57) ABSTRACT

An actuator tip diffuser may be retrofitted onto existing pump dispensers to create a scatter flow. The scatter flow can be induced by using patterns with larger area sections produce separate, individual streams. Increasing the length of the orifice adapter and adding a center outer ring also reduced spatter. In all instances, the actuator tip diffuser includes a through-channel, with an inlet fitted to the existing actuator nozzle on one end and a downwardly disposed outlet for discharging fluid via the pattern of orifices/structure noted above. The tip may also include one or more retainer tabs to create a snap fitting to existing dispenser pumps.

10 Claims, 9 Drawing Sheets

(56) References Cited

U.S. PATENT DOCUMENTS

| | | | |
|---|---|---|---|
| 6,082,589 A | 4/2000 | Ash et al. | |
| 8,104,650 B2* | 1/2012 | Lang | B05B 11/3087 |
| | | | 222/571 |
| 2002/0170984 A1* | 11/2002 | Tsai | B05B 1/185 |
| | | | 239/499 |
| 2009/0188946 A1* | 7/2009 | Chien | B05B 11/0032 |
| | | | 222/321.3 |
| 2011/0049268 A1* | 3/2011 | Chien | B05B 1/3402 |
| | | | 239/498 |
| 2011/0049269 A1* | 3/2011 | Chien | B05B 1/30 |
| | | | 239/498 |
| 2011/0068198 A1* | 3/2011 | Jost | B05B 15/65 |
| | | | 239/333 |
| 2011/0139903 A1* | 6/2011 | Chien | B05B 1/30 |
| | | | 239/498 |
| 2014/0263414 A1 | 9/2014 | San Miguel et al. | |

\* cited by examiner

| | | |
|---|---|---|
| Figure 5A and 5B |  | |
| Figure 6A and 6B |  | |
| Figure 7A and 7B |  | |

BEVERAGE DISPENSER WITH REDUCED DRIP AND SPLATTER DIFFUSER TIP

CROSS REFERENCE TO RELATED APPLICATIONS

This application claims priority to U.S. provisional patent application Ser. No. 62/620,708, filed on Jan. 23, 2018, which is incorporated by reference.

TECHNICAL FIELD

The present invention relates generally to pump dispensers and, more specifically, to an improved pump and dispenser arrangement incorporating a redesigned diffuser tip to impart desired fluid characteristics for the dispensed beverage while simultaneously minimizing loss due to unwanted dripping and/or splattering.

BACKGROUND

As examples, U.S. Pat. No. 6,082,589 and United States Patent Publication 2014/0263414 disclose "slush" or frozen beverage dispensing systems. As described in these documents (the entirety of which are each incorporated by reference herein), it is desirable to combine flavorings with a base fluid (which may be partially frozen or "slush"). In some settings, users will want to select from a plurality of different flavors although, for obvious reasons, each of these flavoring must be kept separate from one another in order to maintain their original and intended taste.

One common means of providing flavorings is by way of a simple hand-actuator dispenser pump. Separate pumps can be affixed to each flavoring container so that the initial slush is mixed with selected flavoring(s) from the separate container and then mixed appropriately to create the desired flavored, slush drink. Of course, this method is also applicable to liquids that are not partially or completely frozen, and the invention described herein is equally applicable to ambient or non-frozen beverage mixtures.

One overlooked aspect of dispensing schemes described above is that an inefficient dispensing pump can cause unwanted loss of flavoring fluid. For example, a dispenser pump may include a nozzle that fails to provide a consistent stream, which leads to splashing and splattering of flavoring fluid that may not be collected in the final mixing cup. Splattering is also unsightly.

Additionally, inefficient or non-optimized outlets and dispensing nozzles can also lead to loss of flavoring product by way of dripping when the dispenser is not in use. That is, the pump is unable to expel all of the flavoring fluid from its nozzle in a timely manner, so that the time-lapsed effects of gravity eventually allows fluid retained in the pump/nozzle to eventually drip out. In such cases, it is unlikely that a mixing cup will be present, causing loss of flavoring product. Also, if dripped product is not properly cleaned from the base of the dispensing system, it can lead to spoilage, contamination, and unhygienic conditions.

Notably, conventional dispensing pumps typically have a single outlet channel communicating with the flow channel formed in the actuator head. To the extent the actuator head and flow channel are inclined downward, dripping of more viscous fluids after dispensing/actuation is completed is another challenge.

A dispenser that is appropriate for mixing beverages without unwanted loss of the base product due to dripping and splattering would be welcome. Further, an attachment that could be retrofitted to existing pump dispensers would be especially welcome.

SUMMARY

An actuator tip diffuser may be retrofitted onto existing pump dispensers to create a scatter flow to minimize unwanted splattering and improve delivery of the dispensed fluid. The scatter flow can be induced by using a plurality of openings at the outlet, with each opening having a tapered or irregular shape relative to its form from the central axis to the radial periphery of the circular or curving outlet. Each opening cooperates to produces individual streams. Increasing the length of the orifice adapter and adding a center outer ring also reduced spatter. In all instances, the actuator tip diffuser includes a through-channel, with an inlet fitted to the existing actuator nozzle on one end and a downwardly disposed outlet for discharging fluid via the pattern of orifices/structure noted above. The tip may also include one or more retainer tabs to create a snap fitting to existing dispenser pumps.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 3A is a perspective view of the diffuser head attached to a section of the actuator and showing the array of apertures, while

FIG. 4A is a perspective view of the diffuser head attached to a section of the actuator and showing the array of apertures, while

FIG. 5A is a perspective view of the diffuser head attached to a section of the actuator and showing the array of apertures, while

FIG. 6A is a perspective view of the diffuser head attached to a section of the actuator and showing the array of apertures, while

FIG. 7A is a perspective view of the diffuser head attached to a section of the actuator and showing the array of apertures, while

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A container, including a pump dispenser, is contemplated. The combination may have any number of features that are commonly encountered in this field, including but not limited to a screw fit arrangement between the closure and the container to allow the container to selectively removed, refilled, and/or replaced. When fitted, the combination may form a watertight, hermetic, and/or sanitary seal.

Figure 1:
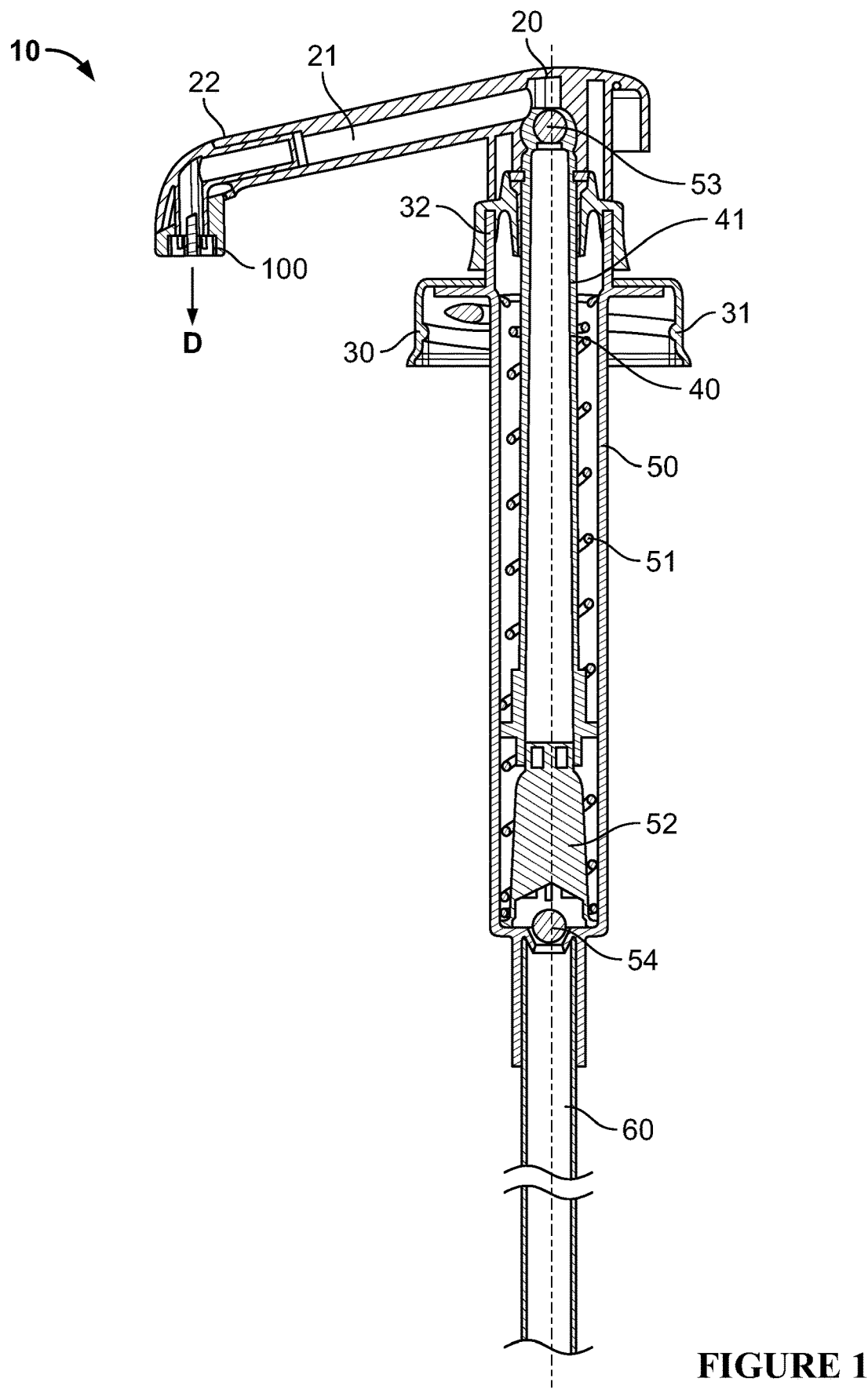
FIG. 1 is a cross sectional side view of a dispensing system including a pump and actuator combination with a diffuser head according to certain embodiments contemplated herein.

FIG. 1 shows one type of pump dispenser that is well suited to incorporating the diffuser head of the invention. However, it will be understood that any number of other designs can be used without departing from the invention. In fact, the primary feature that is required is a dispenser having an actuator channel into which the anti-splatter diffuser may be fitted.

The inventive diffuser head 100 is fitted onto dispensing system 10. System 10 includes an actuator head 20, closure 30, and piston 40. The features highlighted for system 10 are merely exemplary, and any number of iterations may be used in combination with diffuser head 100. Also, system 10 may be fitted to any appropriate container, which is not shown for the sake of clarity and simplicity.

As shown, actuator 20 encases a dispensing channel 21 with a distal opening 22 through which fluid is dispensed. To the extent dispensing channel 21 is inclined downward, as seen in FIG. 1, a fitting, such as diffuser 100, can be attached to act as a valve or anti-drip device to prevent unwanted loss of fluid after a dispensing event is complete.

Actuator 10 reciprocates relative to the closure 30 and piston 40, typically by way of a biasing member or spring 51 constrained within the housing 50 and anchored at spring seat 52. In operation, spring 51 urges the actuator 10 upward to draw fluid through the dip tube 60 and into the piston 40. After initial priming, this action forces fluid already in the piston 40 to temporarily displace upper ball valve 53 and push the fluid into the dispensing channel 21. A lower ball valve 54 is positioned proximate the spring seat 52 to ensure fluid primed into the pump does not drain out owing to gravity. Preferably, spring 51 is sealed off away from the fluid flow path formed between dip tube 60 and actuator 10 (i.e., distal opening 22 or diffuser tip 100).

Closure 30 includes appropriate structure, such as skirt 31, to engage and seal the container neck (not shown). Commonly, screw threads or snap fittings are used to attach to the container and, more specifically, the opening or neck of the container. A chaplet 32 defines an aperture for the piston stem 41, while coaxially aligned cylinders within the piston 40 and housing 50 cooperate to deliver the features described herein. Closure 30, skirt 31, and/or chaplet 32 cooperate with the piston 40 and/or actuator 10 to seal the system 10 and prevent unwanted leakage or loss of fluid from the container, during both storage and dispensing.

Preferably, the outlet facing 102 for system 10 is disposed directly downward along dispensing axis D. This arrangement proves to be particularly useful in the food and beverage dispensing field so that the fluid being dispensed can be reliably deposited into a cup or onto whatever serving vessel is appropriate to the fluid/use. In some pumps, dispensing channel 21 will be formed to accomplish this redirection, although diffuser head 100 is designed to accommodate this preferred orientation by having an angled through channel.

As noted above, this downward orientation exacerbates the tendency for fluids—and especially viscous fluids—to drip after the intended dispensing event. Also, if the opening 22 is a single, circular shape, the flow created by the pumping/dispensing action of system 10 tends to cause the fluid to stream out of opening 22 in a turbulent manner. This results in a non-uniform stream (i.e., portions of the fluid diffuses outward, rather than along the axis D) that creates splatter. When unwanted dripping or splattering occur, fluid is wasted.

Figure 2A:
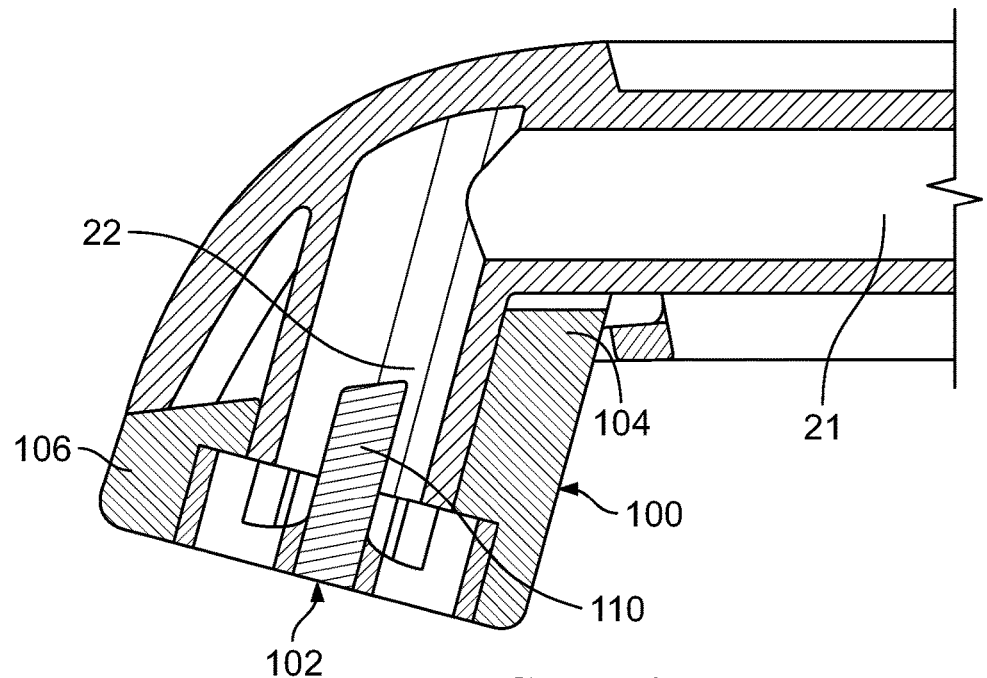
FIG. 2A is a cross sectional side view of the diffuser head attached to the actuator.

Diffuser head 100 is seen in cross section in FIG. 2A, as well as in the exemplary perspective views of FIGS. 3A through 7B. Generally speaking, diffuser 100 includes an outlet facing 102 at one end and an actuator attachment facing 104 at the opposing end. A flow channel 110 is provided within the body 106, with the channel 110 being of an appropriate diameter/size to cooperate with, seal, and accommodate flow from the dispensing channel 21 and opening 22.

Unlike FIG. 1, FIG. 2A also shows an actuator nozzle piece 23 interposed between opening 22 and diffuser 100. Nozzle 23 redirects and reorients the path of fluid as it exits the dispensing channel 21. Preferably, the exit axis D is close to a vertical axis or, as shown, at an acute angle to either of these axes. When used, nozzle 23 includes an interior flow channel that cooperates with and seals channel 21 on one end and diffuser flow channel 110 on the opposing end. Alternatively, diffuser head 100 can be formed as a unitary piece attaching directly to opening 22 so that the desired redirection and reorientation, including an angle within channel 110.

Body 106 may be formed to be flush with the exterior surfaces of the actuator 10. The actuator facing 104 forms a seal at least along the fluid flow path (i.e., channels 21 and 110).

The outlet facing 102 may include a faceplate 120. A plurality of apertures 122 are formed within the faceplate 120, with the apertures 122 arranged in a circular or curved manner that matches the shape of the flow path (i.e., the shape of opening 22 and, more generally, the cross sectional shape of the tube forming that flow path). In some aspects, there are 5 or 6 identically shaped apertures 122 spaced evenly apart (both in terms of being offset from the center and in relation to one another around the circumference of the circle/curve).

Figure 2B:
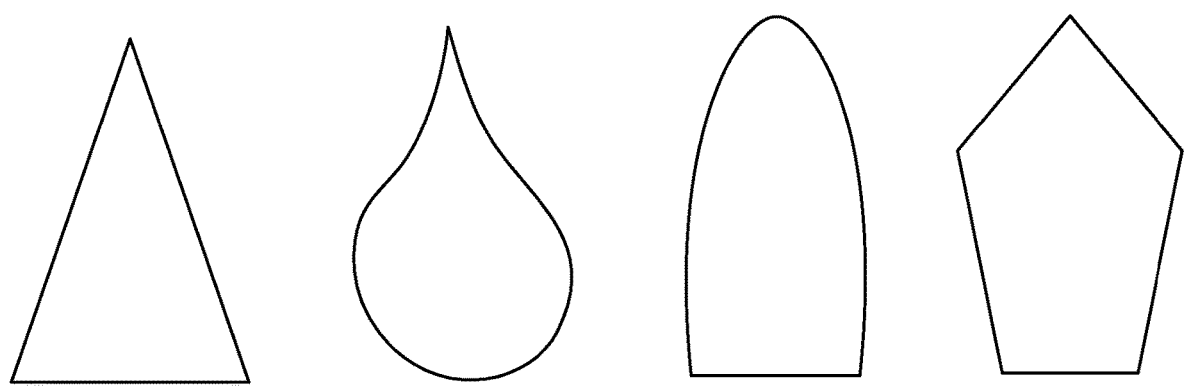
FIG. 2B are exemplary irregular shapes for the apertures of the diffuser head.
Figure 3A:
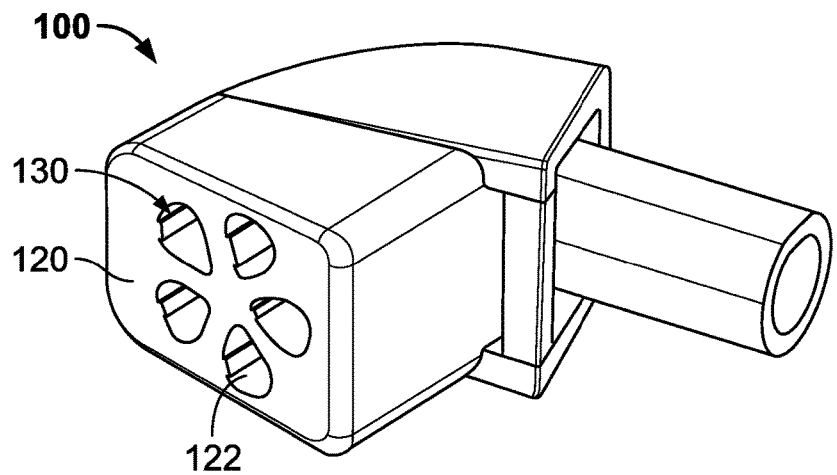
Figure 3B:
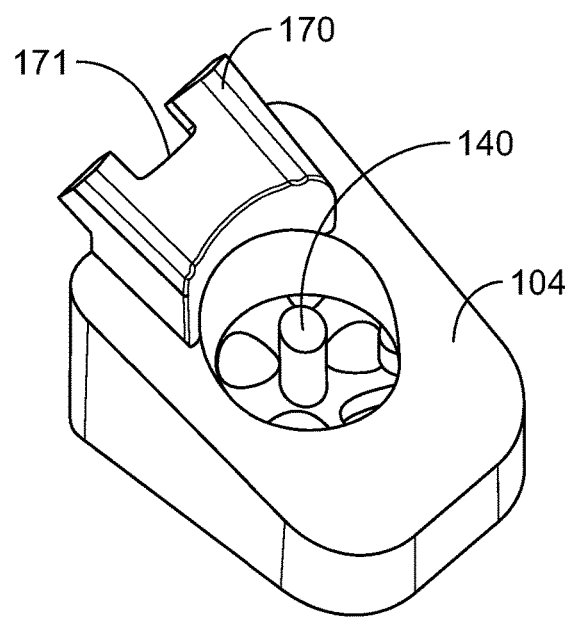
FIG. 3B is a sectional, perspective view of the underside of only that diffuser head.

Each aperture has a teardrop shape 130 or some other tapered shape. As used herein, tapered shape means that the aperture is elongated with the end closer to the center point of the flow path having a different width than its opposing end on that shape. In this manner, the sides of the aperture shape slope toward or away from one another. Notably, teardrop and irregular shapes 130 performed better than conventional, circular openings on both splatter and dripping, while arrays of symmetrical, non-tapered, oblong shapes in the diffuser head aperture pattern provided acceptable splatter results. Non-limiting examples of shapes 130 are shown in FIG. 2B (note that these may be inverted so the wider end is disposed closer or farther away), while a preferred shape can be seen most clearly in FIG. 3A.

Figure 4A:
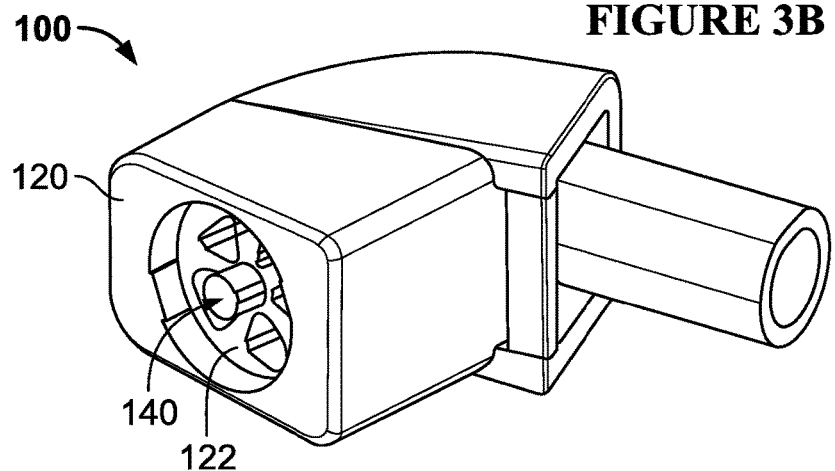
Figure 4B:
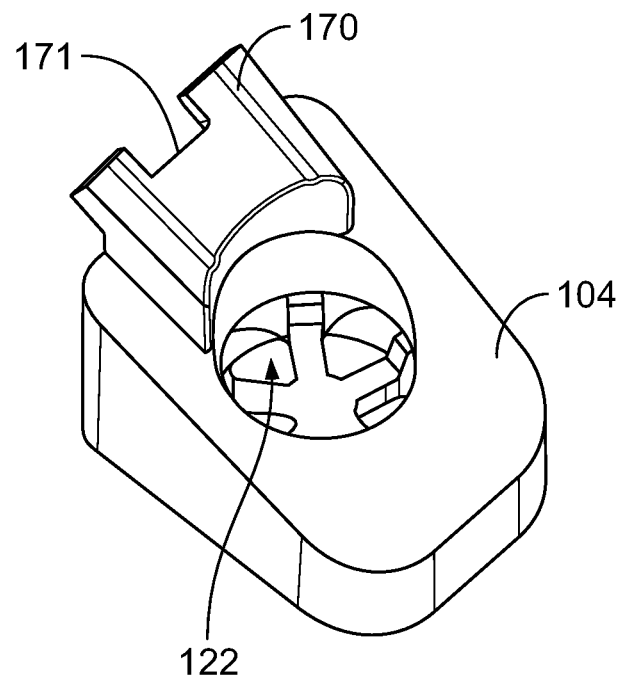
FIG. 4B is a sectional, perspective view of the underside of only that diffuser head.
Figure 5A:
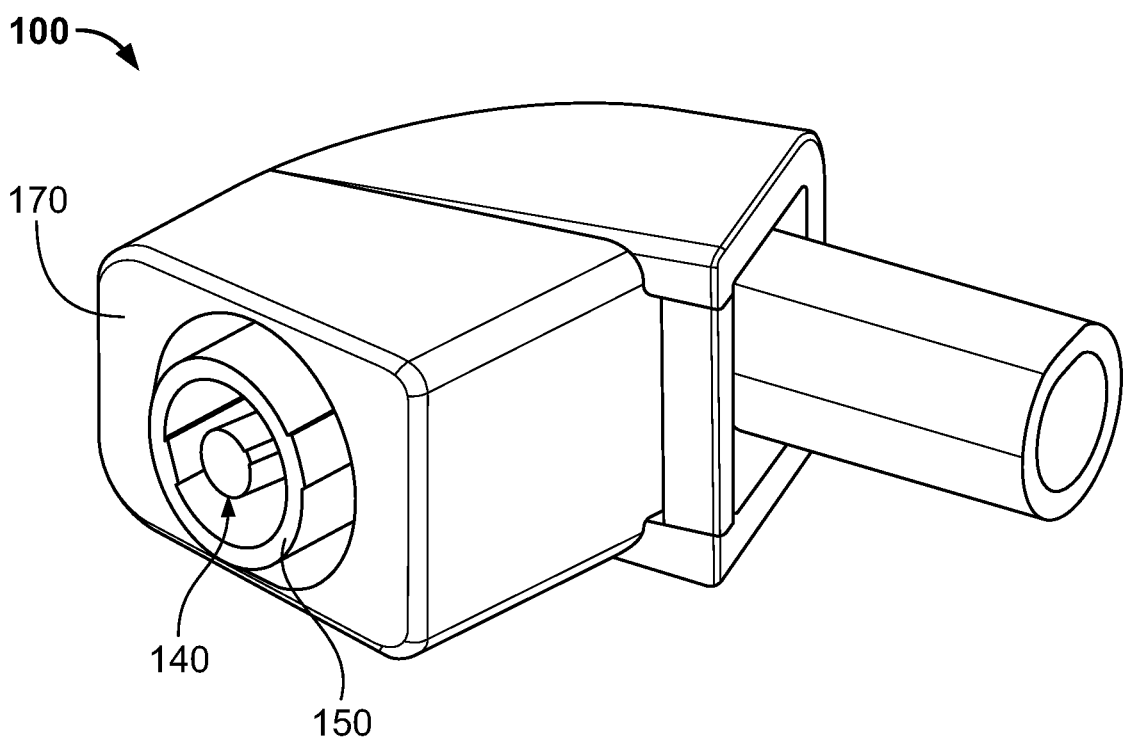
Figure 5B:
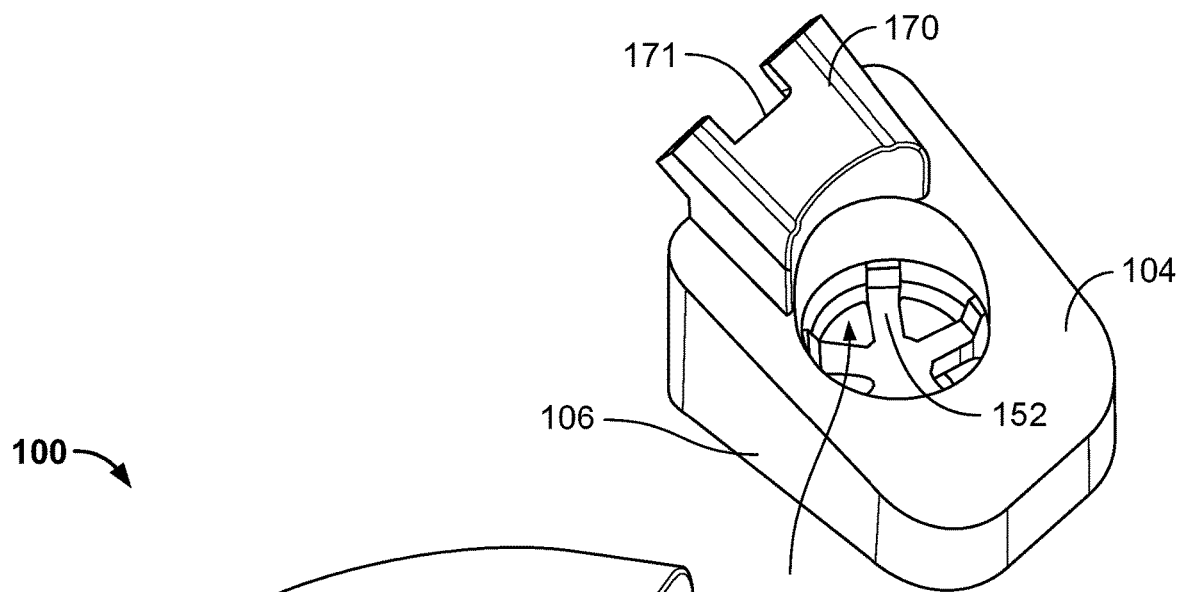
FIG. 5B is a sectional, perspective view of the underside of only that diffuser head.
Figure 6A:
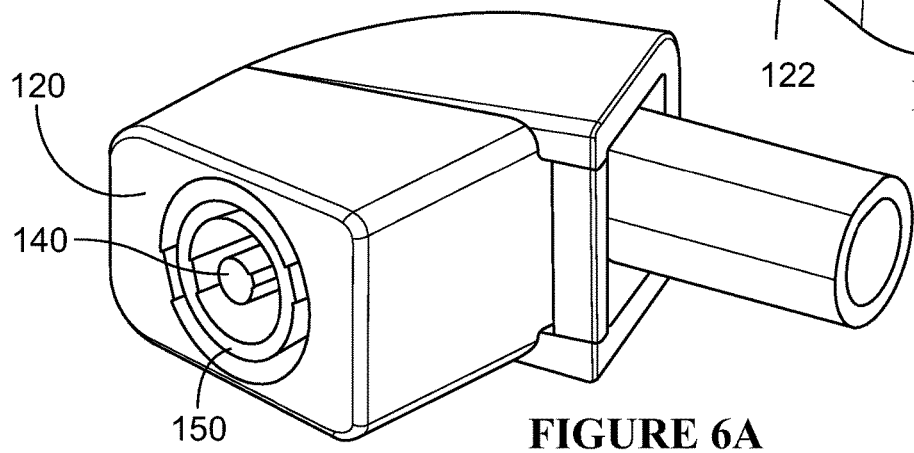
Figure 6B:
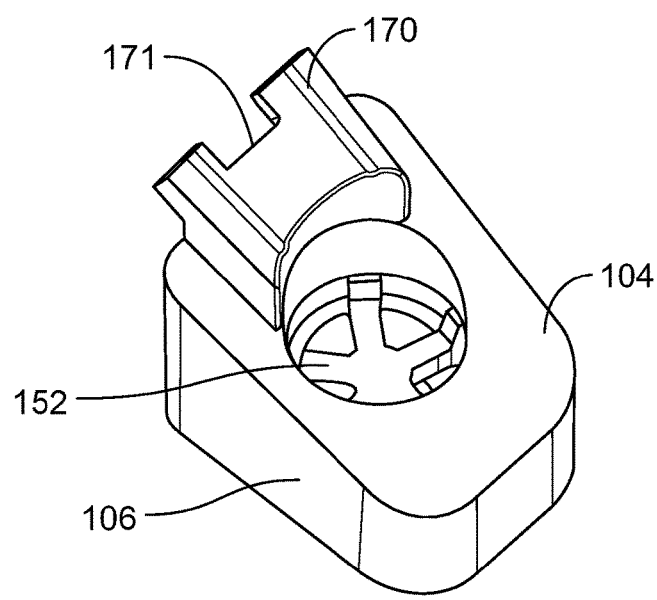
FIG. 6B is a sectional, perspective view of the underside of only that diffuser head.
Figure 7A:
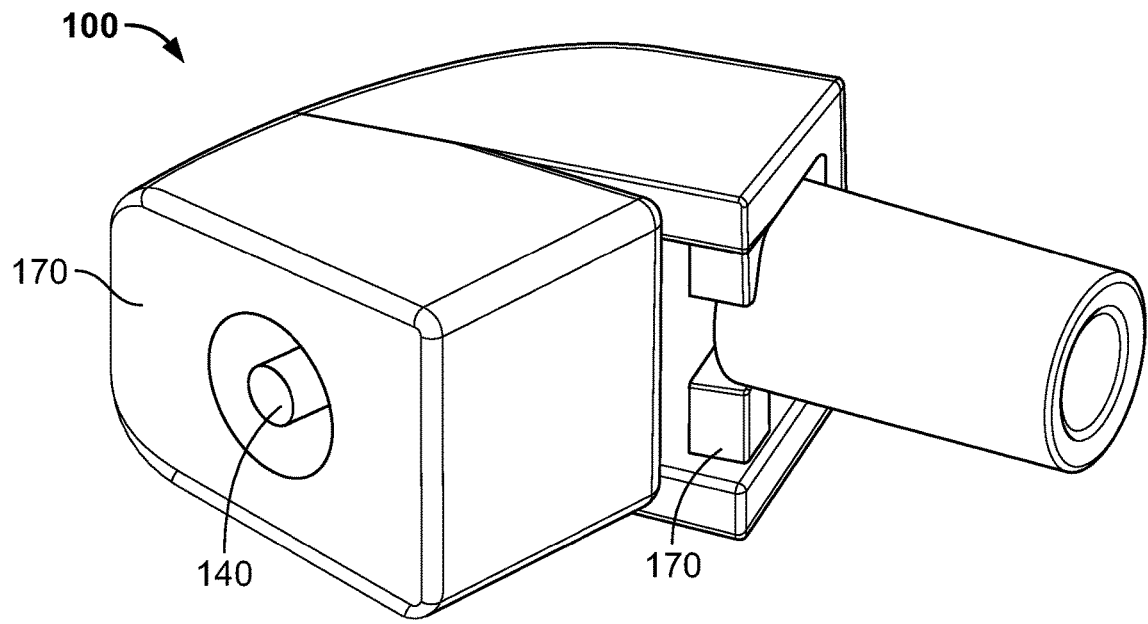
Figure 7B:
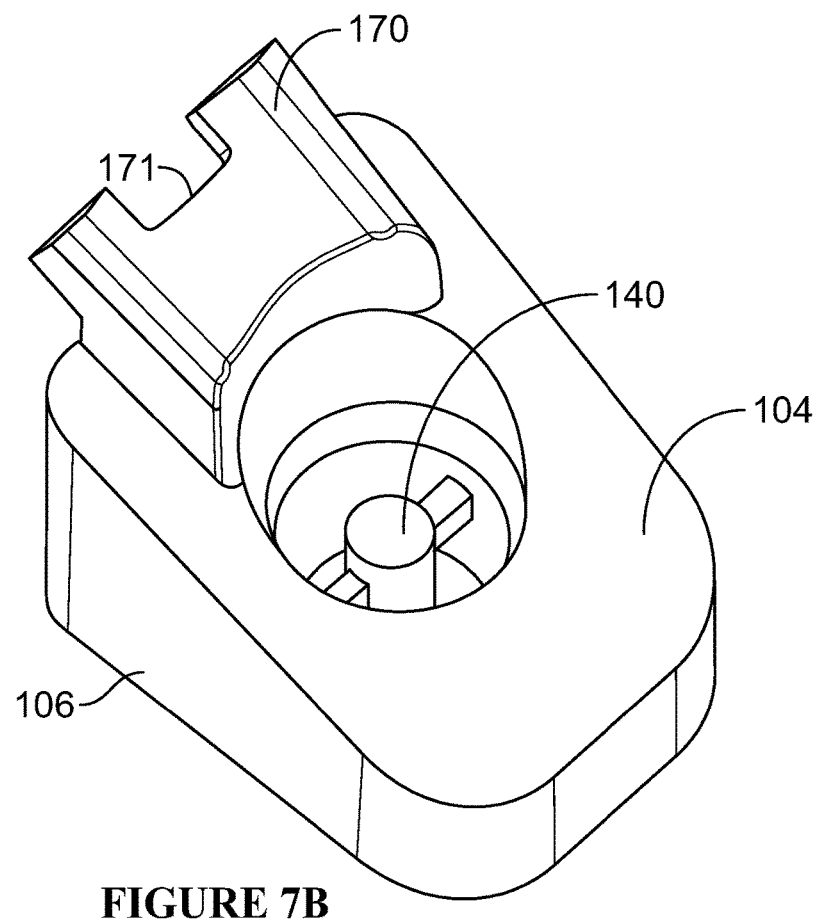
FIG. 7B is a sectional, perspective view of the underside of only that diffuser head.

The apertures 122 be formed flush with faceplate 120/outlet facing 102 (as in FIGS. 3A and 7A) or they may be formed on a separate panel or plane 121 that is inset within the diffuser head relative to facings 120, 102 (as in FIGS. 4A, 5A, and 6A). Further, apertures 122 should be distinguished from valved surfaces, such as a selectively opening elastomeric duckbill. The inventors have found that the pressure/force required to force open such valves tends to increase splatter relative to the inventive structures identified herein.

In some embodiments, a center post 140 may extend axially in the same direction as axis D on either or both sides of outlet facing 102. Post 140 helps to distribute the flow of the fluid as it passes through channel 110 along axis D. In this manner, a more controlled flow with reduced splatter is realized.

Another feature that may be used is a flush or protruding ring feature 150. Ring 150 can be used in conjunction with or in place of center post 140. As above, ring 150 helps to control the flow.

Apertures 122, post 140, and ring 150 may all be integrally formed with the diffuser body 106. For example, diffuser 100 can be injection-molded or formed according to other, similar manufacturing processes. This enables the use common thermoplastics like polyethylene and polypropylene. One or more connecting bridges 152 help to secure any of these features to the body 106 and/or an inner facing of the channel 110.

As seen in FIGS. 3B, 4B, 5B, 6B, and 7B, one or more retainer tabs 170 are provided on actuator facing 104. Preferably, at least two tabs 170 are used. Tabs 170 create a snap or interference fit to attach diffuser 100 to actuator 10. In some embodiments, a bridging section 171 ensures a smooth and continuous flush-fitting between the diffuser 100 and the surface of dispensing channel 21.

A comparative drip test can be employed to quantitatively measure how much product is lost over a defined period of time after the dispenser pump is used. For example, a given quantity of liquid is dispensed, after which a separate receptacle collects and measures (e.g., volumetrically or gravimetrically) the amount of product that is lost due to unwanted dripping.

In the same manner, a splatter test can be employed for determining improvements to the diffuser designs. This test is inherently comparative, insofar as it allows for qualitatively and quantitatively determining whether a given diffuser attachment performs better in comparison to an existing/original pump.

One exemplary splatter/drip test consists of the steps of:
A. Prime pump into 8 oz. paper cup until full dosage dispenses from actuator nozzle, then 3 extra pumps (approx. 1⅛ oz.).
B. Using a 12 oz. paper cup, pump primed product out at a rate of 1 stroke per second, for 5 full hard strokes.
C. Take photographs of the product spatter in the cup and drippage on nozzle.
D. Tilt pump approx. 45° side to side and front to back to check for drippage from tip.
E. Purge remaining product from pump into 8 oz. cup and pour all syrup back into bottle.
F. Clean/purge all product from pump with water.
G. Place pump into container of clean water and retest for spray/spatter using water only, repeating steps A and B above.
H. Repeat with all samples.

The exemplary splatter/drip test may be performed in conjunction with an ordinary paper cup. The amount of fluid immediately provided to the bottom of the cup can be measured (e.g., volumetrically and/or gravimetrically), while the splatter pattern can be analyzed by inspection or more sophisticated optical analysis. Additionally or alternatively, the dispensed fluid could be removed from the cup, and the remaining fluid splattered on the sides of the cup could be measured (e.g., gravimetrically).

Figure 8:
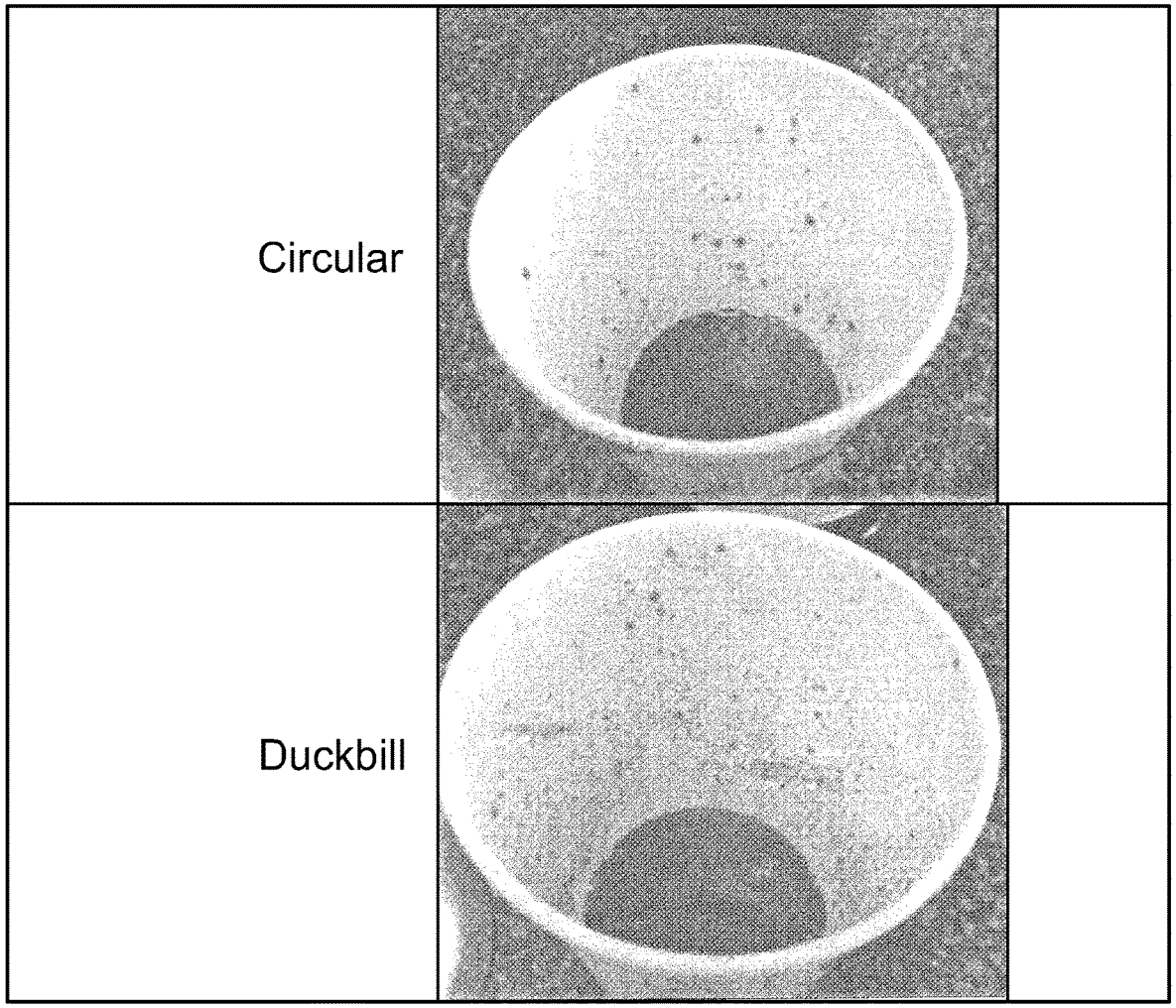
FIG. 8 is a table including photographic results of the splatter test according to various conventional pump designs.
Figure 9A:
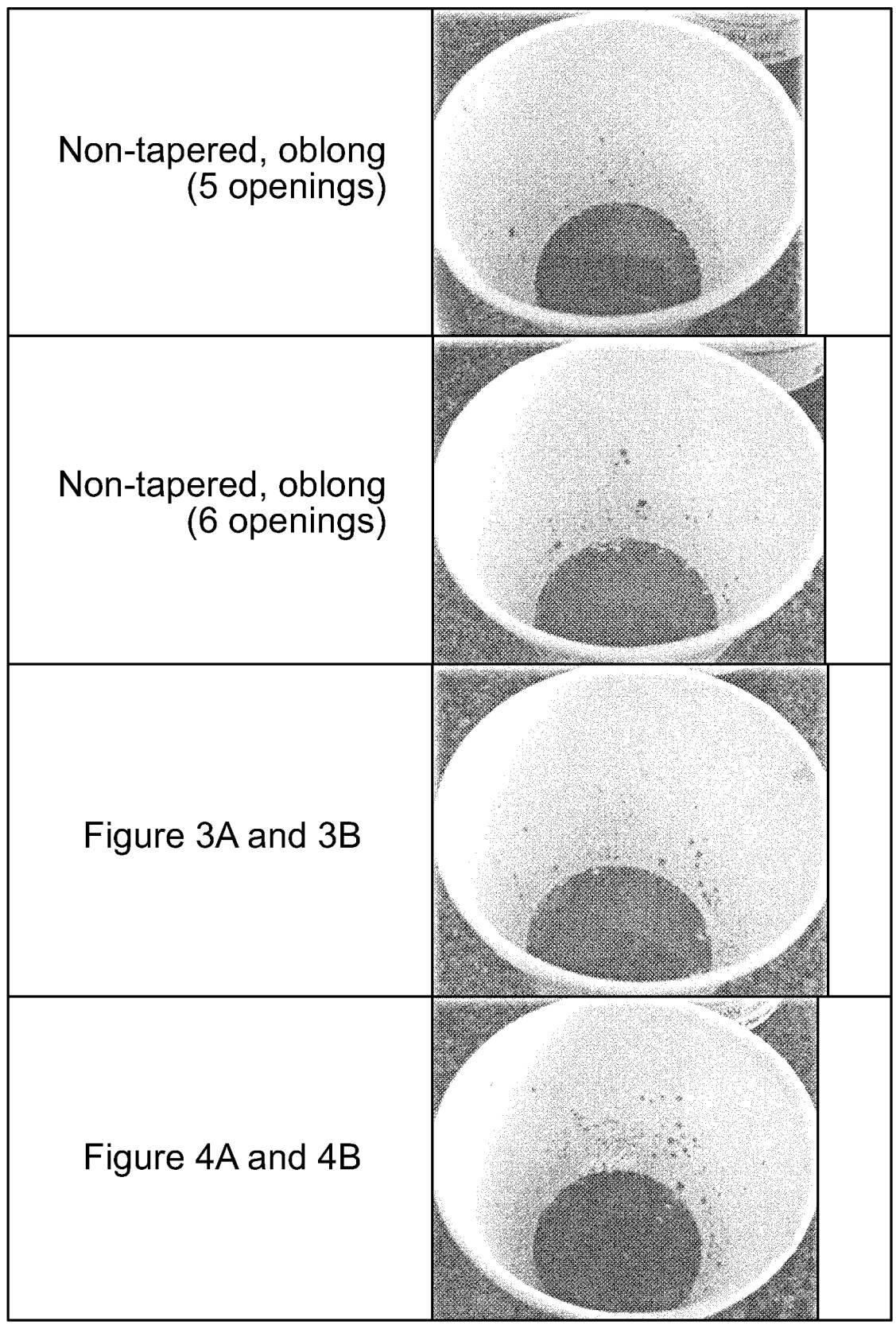
FIGS. 9A and 9B are tables including photographic results of the splatter test according to various disclosed embodiments of diffuser heads.
Figure 9B:
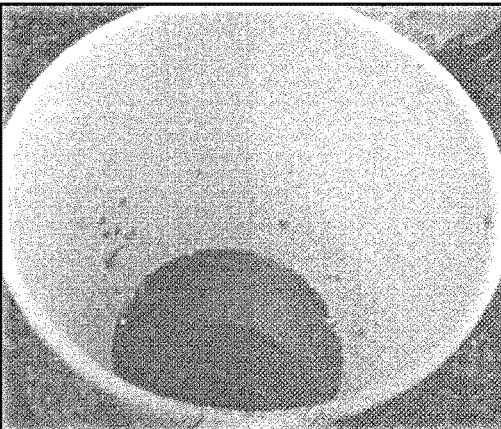
Figure 9B:
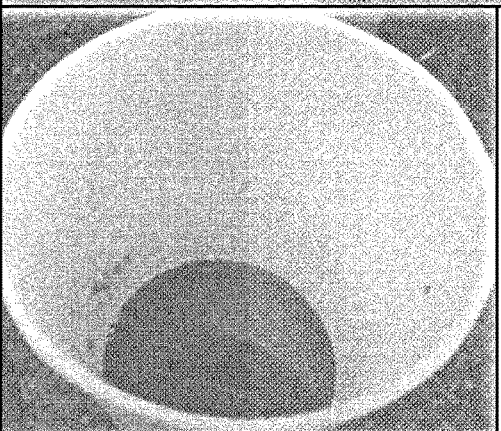
Figure 9B:
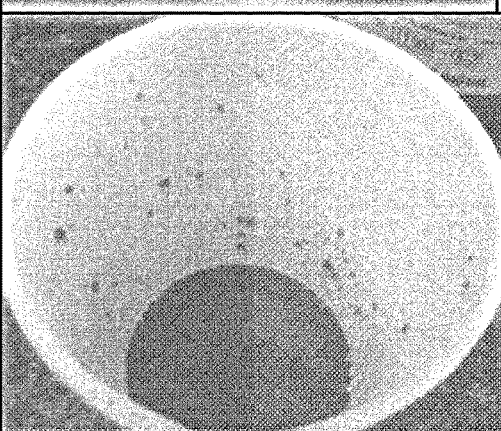

FIG. 8 shows the performance of conventional pump on the splatter/drip test, while FIGS. 9A and 9B show performance results of various diffuser heads. All tests were conducted on the same pump/container apparatus and using the same fluid in order to control unwanted variables. Any relative terminology (e.g., "hard pump strokes") should be understood to have been performed at identical levels of force between the various tests, while use of other comparative terms should also be interpreted in the context of these tests. Therefore, even if a precise amount of splatter was not quantified, the observation that any one concept may have resulted in "no drip" or "medium splatter" should still be understood in reference to the other test results described in the attachment.

Generally speaking, patterns with smaller cross sectional outlets produced higher stream force and higher splatter and splashing. The duckbill orifice for reduced flow cross section performed particularly poorly, in terms of splattering splashing. Conversely, patterns with large and/or multiple cross sectional areas provided for separate, individual streams that reduced splatter and splashing, while increasing the length of the orifice adapter and adding a center outer ring structure also accomplished these same goals.

Based on these results, the preferred diffuser or diffuser tip attachment includes an inlet tube configured to abut or cooperate concentrically with the corresponding channel on a pump dispenser. That is, the actuator facing 104 includes a bridging piece 171 extending into channel 21 so as to allow for smooth flow/transition.

At least one and, more preferably two, retainer tabs create a snap-fitting or otherwise secure attachment between the pump dispenser and the diffuser attachment. A separate flange may be provided on an opposite side of the inlet channel from the retainer tabs.

In one embodiment, the inlet forms a channel that is redirected downward as fluid is forced through the actuator and diffuser combination. This redirection will occur through approximately a 90 degree angle (+/−30 degrees, with disclosed embodiments contemplated at any whole integer within that range).

In another embodiment, a diffuser tip attachment may be fitted in a downward orientation, so that no redirection of fluid flow is required. In this embodiment, the inlet channel may be formed on a sloping (relative to horizontal) orientation to fit securely onto the actuator tip of the pump.

The diffuser heads 100 may be press fit onto an existing pump at its actuator nozzle without removing any components. In doing so, the resulting apparatus includes an outlet/exit channel for the fluid. The outlet creates an axial flow that is orthogonal to the horizontal surface on which the mixing cup is placed, but with sufficient clearance to allow the cup to be positioned and replaced. The outlet is generally circular, with a series of support members dividing the outlet into discrete apertures or orifices.

At least two orifices are formed. Preferred embodiments contemplate more than three and, most preferably, five or six orifices. The orifices may be arranged around a central post. Each orifice creates a cross sectional opening. Preferably, the cross sectional openings have the same shape. The opening may also possess the same size, so as to ensure even flow through the outlet.

The orifices possess a variable width, for example a tear drop like shape as seen in concepts 3-3d. a ring may be provided flush with the bottom surface of the diffuser, or it may extend below the bottom most surface. The ring remains attached to the diffuser by extension members formed on the orifice dividers. In place of tear drops, other variable width shapes could be employed. Perfectly symmetric shapes, such as oblongs are not as preferred. Irrespective of the number of orifices, it is preferred to distribute the orifices uniformly across the outlet so as to allow for the most efficient, low-turbulence flow.

Ultimately, the number, shape, and orientation of the orifices may be influenced by the ability to mold appropriate thermoplastics. That is, a preferred embodiment contemplates molded parts, so that the manufacturing process employed to make these parts should be accounted for.

All components should be made of materials having sufficient flexibility and structural integrity, as well as a chemically inert nature. The materials should also be selected for workability, cost, and weight. Common polymers amenable to injection molding, extrusion, or other common forming processes should have particular utility, although metals, alloys, and other composites may be used in place of or in addition to more conventional container and closure materials.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A dispensing system comprising:
a fluid container with an opening;
an actuator pump having a dispensing channel, said actuator pump coupled to the opening;
a selectively detachable diffuser head fitted to and partially held within the dispensing channel, said diffuser head having a downward-facing outlet divided into an array of teardrop-shaped apertures and wherein each aperture is evenly spaced from:
(i) a central axis of a flow channel defined by the diffuser head, and
(ii) all adjacent apertures, and
wherein the array conforms to a periphery of the outlet to divide fluid flowing therefrom.

2. The system of claim 1 wherein there are 5 or 6 apertures.

3. The system of claim 1 wherein each aperture in the array has an identical surface area and shape.

4. The system of claim 1 further comprising a central post held concentrically within the outlet by way of one or more connecting bridges spanning an inner facing of the outlet.

5. The system of claim 1 further comprising a hollow, tubular ring on the diffuser head proximate to the outlet by way of one or more connecting bridges spanning an inner facing of the outlet.

6. The system of claim 5 wherein the ring is flush with an outer facing of the diffuser head at the outlet.

7. The dispensing system according to claim 1 wherein the array is arranged in a circular pattern.

8. A dispensing system comprising:
a fluid container with an opening;
an actuator pump having a dispensing channel, said actuator pump coupled to the opening;
a selectively detachable diffuser head fitted to and partially held within the dispensing channel, said diffuser head having:
(i) a downward-facing outlet divided into an array of apertures centered and evenly spaced around the periphery of the outlet to divide fluid flowing thereform,
(ii) a diffuser body,
(iii) one or more connecting bridges connected to the diffuser body and defining the array of apertures, and
(iv) a ring secured to at least one of the one or more connecting bridges and extending downwardly and away from the dispensing channel and outlet.

9. The system according to claim 8 further comprising a central post held concentrically within and aligned along an axis of the flow channel, said post secured to at least one of the one or more connecting bridges and spaced apart from the ring to create a flow path therebetween.

10. A dispensing system comprising:
a fluid container with an opening;
an actuator pump having a dispensing channel, said actuator pump coupled to the opening;
a selectively detachable diffuser head fitted to and partially held within the dispensing channel, said diffuser head having:
(i) a downward-facing outlet divided into an array of apertures centered and evenly spaced around the periphery of the outlet to divide fluid flowing thereform,
(ii) a diffuser body,
(iii) one or more connecting bridges connected to the diffuser body and defining the array of apertures, (iv) a ring secured to at least one of the one or more connecting bridges and extending downwardly and away from the dispensing channel and outlet, and
(v) a central post held concentrically within and aligned along an axis of the flow channel, secured to at least one of the one or more connecting bridges, and spaced apart from the ring to create a flow path therebetween.

* * * * *